US010430765B2

(12) United States Patent
Hausler et al.

(10) Patent No.: US 10,430,765 B2
(45) Date of Patent: Oct. 1, 2019

(54) PROCESSING KEYBOARD INPUT TO PERFORM EVENTS IN RELATION TO CALENDAR ITEMS USING A WEB BROWSER-BASED APPLICATION OR ONLINE SERVICE

(71) Applicant: salesforce.com, inc., San Francisco, CA (US)

(72) Inventors: Jesse Hausler, Boulder, CO (US); Benjamin Snyder, Royal Oak, MI (US); Laura Nelson, Tiburon, CA (US); Sumanth Anand, Fremont, CA (US); Cordelia McGee-Tubb, San Francisco, CA (US); Kayvaan Ghassemieh, San Francisco, CA (US); Matthew Davidchuk, San Francisco, CA (US); Michael M. Pedersen, II, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 745 days.

(21) Appl. No.: 15/085,515

(22) Filed: Mar. 30, 2016

(65) Prior Publication Data

US 2017/0076252 A1 Mar. 16, 2017

Related U.S. Application Data

(60) Provisional application No. 62/217,382, filed on Sep. 11, 2015.

(51) Int. Cl.
*G06Q 10/00* (2012.01)
*G06Q 10/10* (2012.01)
(Continued)

(52) U.S. Cl.
CPC ......... *G06Q 10/1093* (2013.01); *G06F 3/023* (2013.01); *G06F 3/0482* (2013.01); *G06F 3/0489* (2013.01); *G06Q 30/01* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

FOREIGN PATENT DOCUMENTS

| EP | 2 972 981 | 1/2016 |
| WO | 2014/144796 | 9/2014 |

OTHER PUBLICATIONS

Kendrick, Deborah, GW Micro and Microsoft Launch Window-Eyes for Office Website, Mar. 2014, AccessWorld Magazine, Valume 15, No. 3, https://www.afb.org/afbpress/pubnew.asp?DocID=aw150307, p. 1-7.*

(Continued)

*Primary Examiner* — Eric W Stamber
*Assistant Examiner* — Joseph M Waesco
(74) *Attorney, Agent, or Firm* — Weaver Austin Villeneuve & Sampson LLP

(57) ABSTRACT

Disclosed are examples of systems, apparatus, methods and computer program products for processing keyboard input to perform events in relation to calendar items using a web browser-based application or online service. A database storing data objects identifying calendar items can be maintained. Each calendar item can comprise a subject, a date, and a time range. A bounding window of a web browser comprising one or more panes can be displayed in a user interface on a display of a device. At least one of the panes
(Continued)

can comprise visual representations of a plurality of calendar items stored in the database. Keyboard input from a user interacting with a first calendar item of the plurality of calendar items can be processed. One or more events to be performed in relation to the first calendar item can be determined based on the keyboard input. The determined events can be performed.

20 Claims, 9 Drawing Sheets

(51) Int. Cl.
  *G06Q 30/00* (2012.01)
  *G06F 3/0482* (2013.01)
  *G06F 3/023* (2006.01)
  *G06F 3/0489* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,560,554 B2 | 10/2013 | Gradin et al. |
| 8,560,575 B2 | 10/2013 | Gradin et al. |
| 8,566,301 B2 | 10/2013 | Rueben et al. |
| 8,646,103 B2 | 2/2014 | Jakobson et al. |
| 8,732,150 B2 | 5/2014 | Gradin et al. |
| 8,892,573 B2 | 11/2014 | Gradin et al. |
| 9,063,632 B2 | 6/2015 | Beechuk et al. |
| 10,191,628 B1 * | 1/2019 | Blew .................. H04L 67/12 |
| 10,198,494 B2 | 2/2019 | Hausler et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |

(56) References Cited

U.S. PATENT DOCUMENTS

| | | |
|---|---|---|
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1* | 4/2003 | Coker ............... G06Q 30/02 719/318 |
| 2003/0070004 A1 | 4/2003 | Mukundan et al. |
| 2003/0070005 A1 | 4/2003 | Mukundan et al. |
| 2003/0074418 A1* | 4/2003 | Coker ............... G06F 9/547 709/217 |
| 2003/0120675 A1 | 6/2003 | Stauber et al. |
| 2003/0151633 A1* | 8/2003 | George ............ G06F 17/30905 715/864 |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1* | 10/2004 | Braud ............... G06Q 10/06 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268270 A1* | 12/2004 | Hill ............... G06Q 10/109 715/733 |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0069604 A1* | 3/2006 | Leukart ............ G06Q 10/109 715/792 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0216569 A1* | 8/2009 | Bonev ............ G06F 17/30029 705/5 |
| 2010/0070448 A1* | 3/2010 | Omoigui ............ H01L 27/1463 706/47 |
| 2010/0269049 A1* | 10/2010 | Fearon ............ G06Q 10/109 715/744 |
| 2011/0145823 A1* | 6/2011 | Rowe ............ G06Q 10/109 718/100 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0191716 A1* | 7/2012 | Omoigui ............ H01L 27/1463 707/740 |
| 2012/0233137 A1 | 9/2012 | Jakobson et al. |
| 2012/0290407 A1 | 11/2012 | Hubbard et al. |
| 2012/0303629 A1* | 11/2012 | Klein ............ G06F 9/453 707/741 |
| 2013/0113835 A1* | 5/2013 | Sirpal ............... G06F 3/1438 345/649 |
| 2013/0191145 A1* | 7/2013 | Nudd ............ G06Q 10/063118 705/2 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0297468 A1* | 11/2013 | Hirsch ............... G06Q 40/00 705/32 |
| 2013/0307681 A1* | 11/2013 | Borg ............... G06Q 10/109 340/517 |
| 2013/0311167 A1* | 11/2013 | Borg ............... G06Q 10/109 704/9 |
| 2013/0315040 A1* | 11/2013 | Malkin ............ G04D 99/00 368/10 |
| 2013/0324074 A1* | 12/2013 | Way ............... G06F 1/1626 455/404.2 |
| 2014/0032597 A1 | 1/2014 | Ellis et al. |
| 2014/0032713 A1 | 1/2014 | Phan et al. |
| 2014/0033076 A1* | 1/2014 | Al-Alami ............ G06F 3/0481 715/753 |
| 2014/0129971 A1* | 5/2014 | King ............ G06F 17/30064 715/772 |
| 2014/0195252 A1* | 7/2014 | Gruber ............ G10L 15/22 704/275 |
| 2014/0222814 A1 | 8/2014 | Gradin et al. |
| 2014/0280329 A1 | 9/2014 | Beechuk et al. |
| 2014/0280577 A1* | 9/2014 | Beechuk ............ H04W 4/21 709/204 |
| 2014/0282100 A1 | 9/2014 | Beechuk et al. |
| 2014/0307863 A1 | 10/2014 | Snyder et al. |
| 2014/0310608 A1* | 10/2014 | Snyder ............ G06F 3/04842 715/738 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0058056 A1* | 2/2015 | Comerford ........ G06Q 10/1095 705/7.19 |
| 2015/0095162 A1 | 4/2015 | Jakobson et al. |
| 2015/0106148 A1* | 4/2015 | Thomas ............ G06Q 50/01 705/7.19 |
| 2015/0121299 A1 | 4/2015 | Snyder et al. |
| 2015/0142596 A1 | 5/2015 | Jakobson et al. |
| 2015/0143248 A1* | 5/2015 | Beechuk ............ H04L 67/10 715/739 |
| 2015/0172563 A1 | 6/2015 | Jakobson et al. |
| 2015/0314454 A1* | 11/2015 | Breazeal ............ B25J 9/0003 700/259 |
| 2015/0382167 A1* | 12/2015 | Padmanabhan ........ H04L 67/10 709/206 |
| 2016/0044358 A1* | 2/2016 | Zucchetta ........ H04N 21/26258 725/32 |
| 2016/0057188 A1* | 2/2016 | Padmanabhan .... H04N 21/4126 709/204 |
| 2016/0350721 A1* | 12/2016 | Comerford ........ G06Q 10/1095 |

OTHER PUBLICATIONS

U.S. Appl. No. 15/059,174, filed Mar. 2, 2016, Hausler, et al.
"Google Plus Users", Google+Ripples, Oct. 31, 2011 [retrieved on Feb. 21, 2012 from Internet at http://www.googleplusers.com/google-ripples.html], 3 pages.

* cited by examiner

PROCESSING KEYBOARD INPUT TO PERFORM EVENTS IN RELATION TO CALENDAR ITEMS USING A WEB BROWSER-BASED APPLICATION OR ONLINE SERVICE

PRIORITY DATA

This patent document claims priority to co-pending and commonly assigned U.S. Provisional Patent Application No. 62/217,382, titled "PROCESSING KEYBOARD INPUT TO PERFORM EVENTS IN RELATION TO CALENDAR ITEMS USING A WEB BROWSER-BASED APPLICATION OR ONLINE SERVICE", by Hausler et al., filed on Sep. 11, 2015, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears on the United States Patent and Trademark Office patent file or records but otherwise reserves all copyright rights whatsoever.

TECHNICAL FIELD

This patent document generally relates to displaying calendar items. More specifically, this patent document discloses techniques for processing keyboard input to perform events in relation to calendar items using a web browser-based application or online service.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for processing keyboard input to perform events in relation to calendar items using a web browser-based application or online service. These drawings in no way limit any changes in form and detail that may be made by one skilled in the art without departing from the spirit and scope of the disclosed implementations.

DETAILED DESCRIPTION

Figure 1:
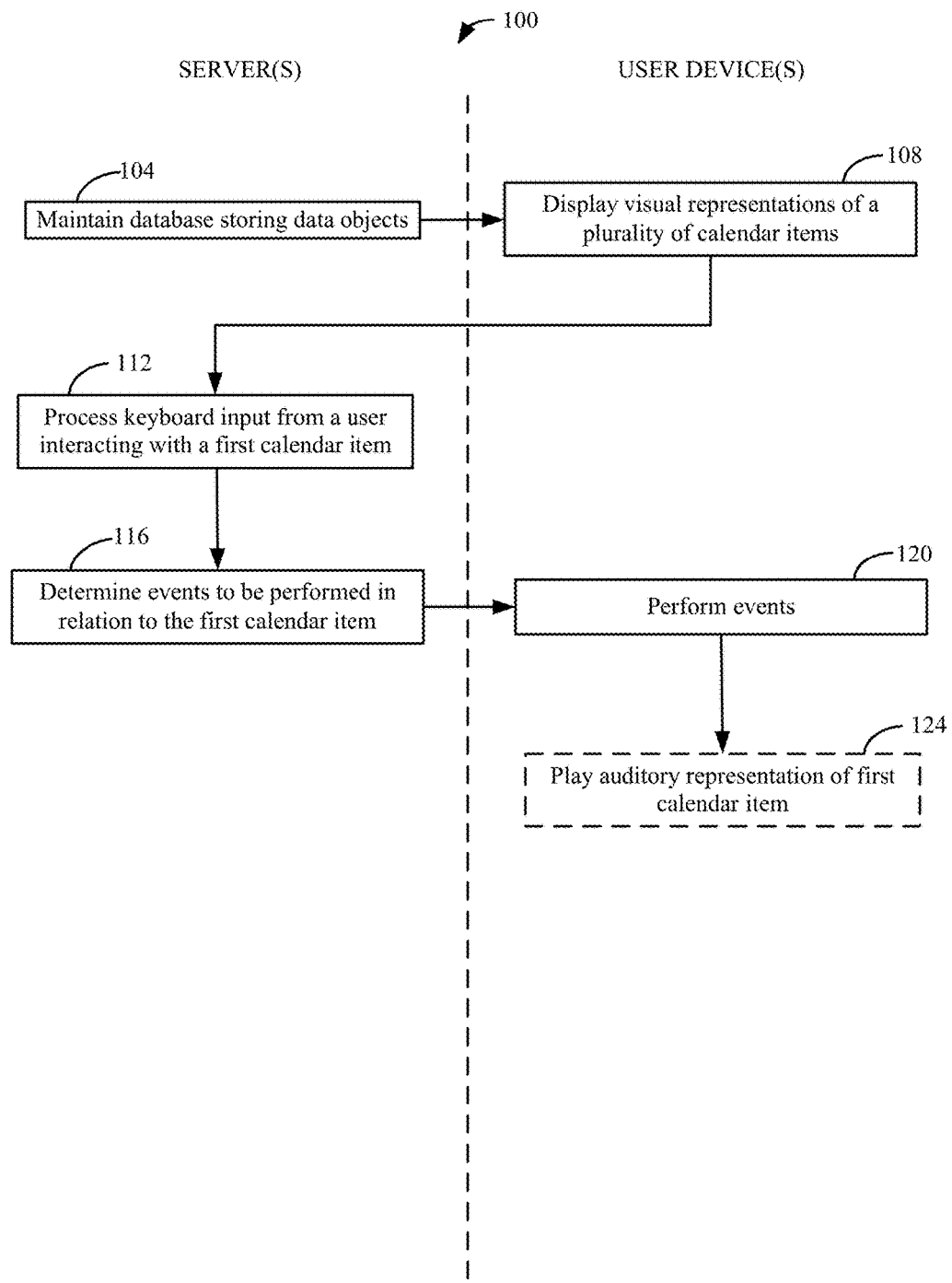
FIG. 1 shows a flowchart of an example of a method 100 for processing keyboard input to perform events in relation to calendar items using a web browser-based application or online service, performed in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for processing keyboard input, such as key strokes on a keyboard of a computing device, to perform events in relation to calendar items using a web browser-based application or online service. As described in further detail below, such events can include a variety of actions or occurrences such as navigating between calendar items, generating, modifying, or deleting calendar items, etc. The concept of calendar items as discussed herein encompasses a range of subject matter. As used herein, the term "calendar item" generally refers to an event having a date, a subject and/or a time-range that can be placed on a calendar. Several examples of a calendar item can include a meeting, an appointment, a get-together, a reminder, etc. Calendar items can be identified by data objects stored in a database that can be accessed by a web-based calendar such as Google Calendar®. Accordingly, such calendar items can be visually represented in a user interface of a display device. Also or alternatively, calendar items can be accessed and utilized in conjunction with any computing application or online service such as, but not limited to, a cloud-based enterprise application.

Conventional web-based calendars can be inaccessible to handicapped users such as users who are visually impaired or unable to use a mouse. By way of illustration, traditional web-based calendars such as Google Calendar® can only be navigated using a mouse. Similarly, visual representations of calendar items in traditional web-based calendars such as Google Calendar® often vary in color. Such color variations frequently lack sufficient contrast to be distinguished by color blind or partially sight-impaired users.

Some of the disclosed techniques can be used to make web-based calendars more accessible to handicapped users. By way of example, Rochester is a sales manager at Eyre books, an online book retailer that provides braille books to blind customers. Rochester is blind and, therefore, cannot navigate his busy web-based calendar using a mouse. In some implementations, Rochester can open his web-based calendar in a web browser window. As described below, he can interact with calendar items of his web-based calendar merely by entering input into the braille keyboard of his computing device. A database system can process such keyboard input and determine events to be performed in relation to a calendar item, such as navigating to the calendar item, or modifying the calendar item, as described below. The database system can then cause such events to be performed.

In some implementations, auditory output can be provided to a sight-impaired user of a web-based calendar to improve his or her experience. For instance, returning to the example of the preceding paragraph, as Rochester navigates between calendar items, his computing device can play auditory representations of calendar items such that Rochester can hear a narration of his navigation between calendar items even though he cannot see the display of his computing device.

Also or alternatively, some of the disclosed techniques can be used to provide a web-based calendar that is highly accessible to both sight-impaired and sight-able users alike. By way of illustration, visual representations can be provided in conjunction with the auditory representations described in the preceding paragraph. A user can interact with such calendar items using traditional mouse-based navigation in addition to using the keyboard-based navigation techniques described above.

Figure 2:
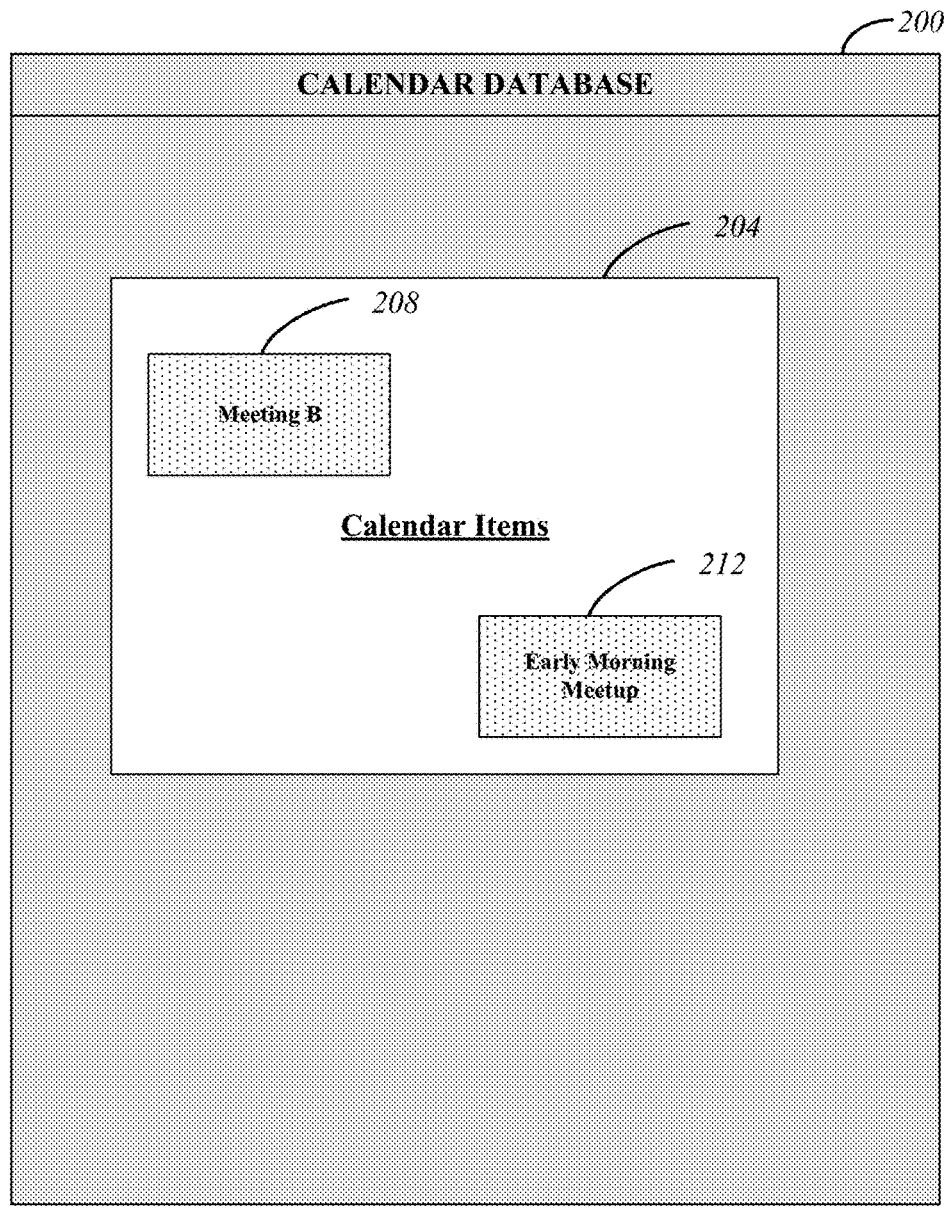
FIG. 2 shows a block diagram of an example of a Calendar Database 200, in accordance with some implementations.
Figure 3:
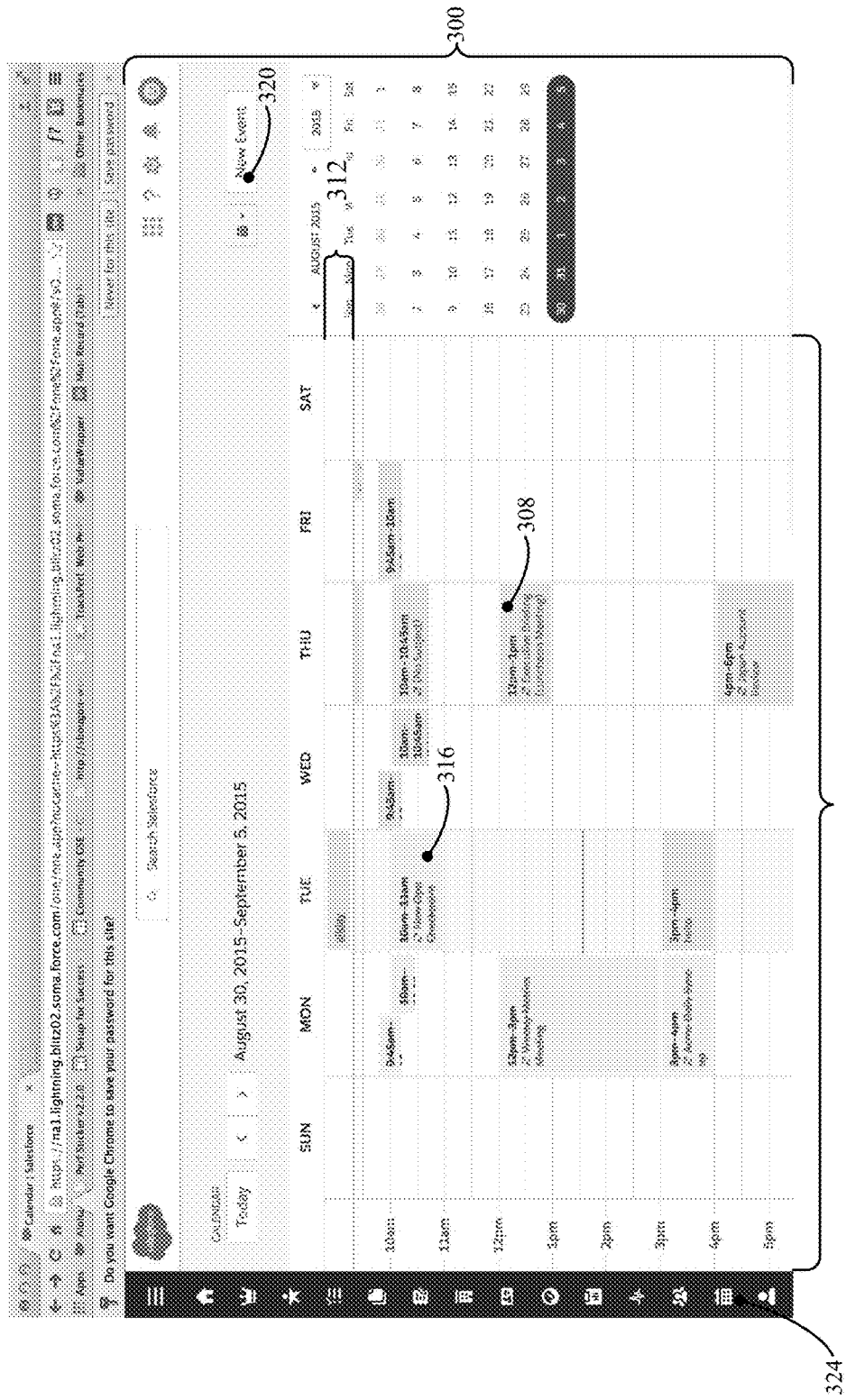
FIG. 3 shows an example of visual representations of calendar items in the form of a graphical user interface (GUI) as displayed on a computing device, in accordance with some implementations.
Figure 4A:
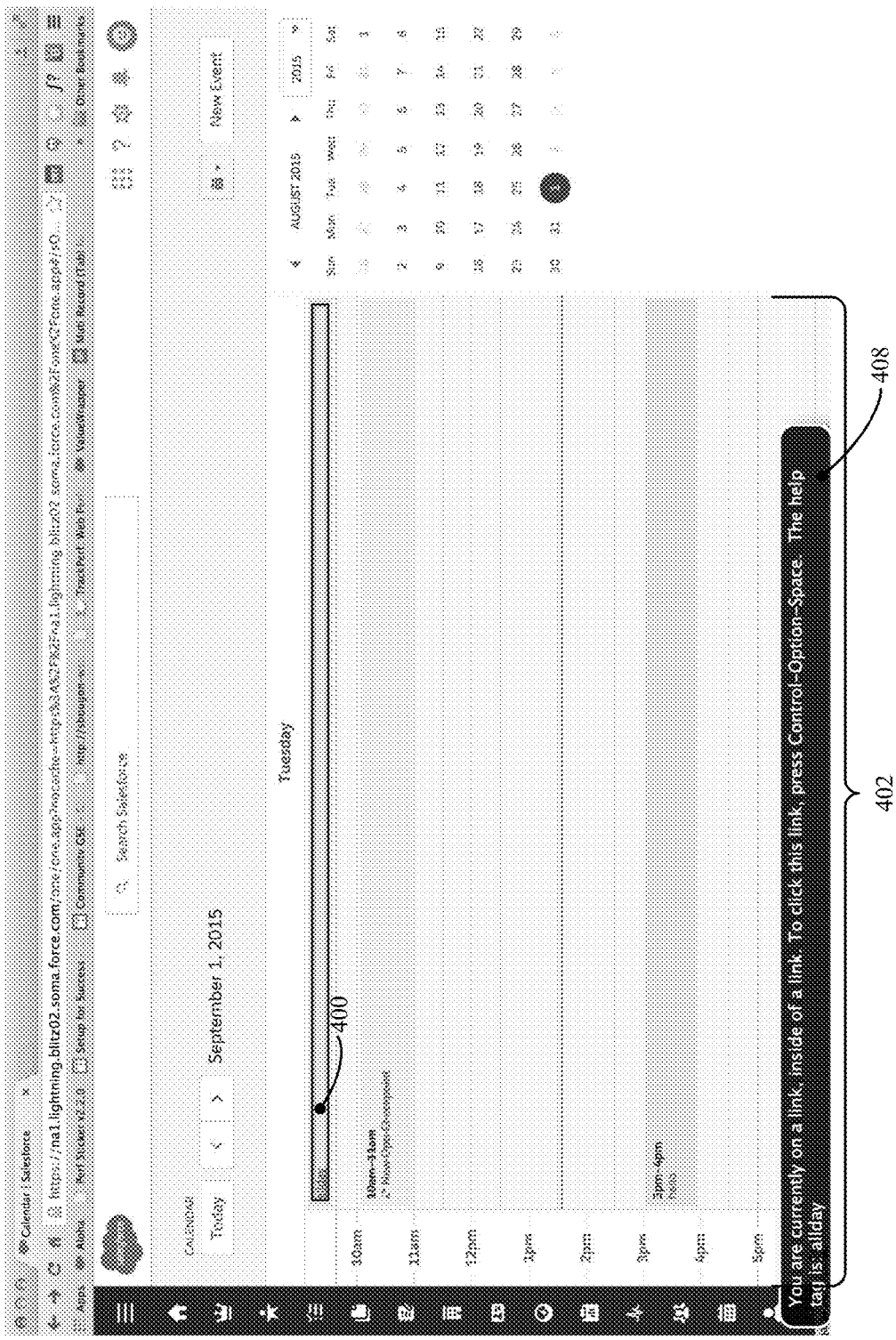
FIGS. 4A-C show examples of visual representations of calendar items in the form of graphical user interfaces (GUIs) as displayed on a computing device, in accordance with some implementations.
Figure 4B:
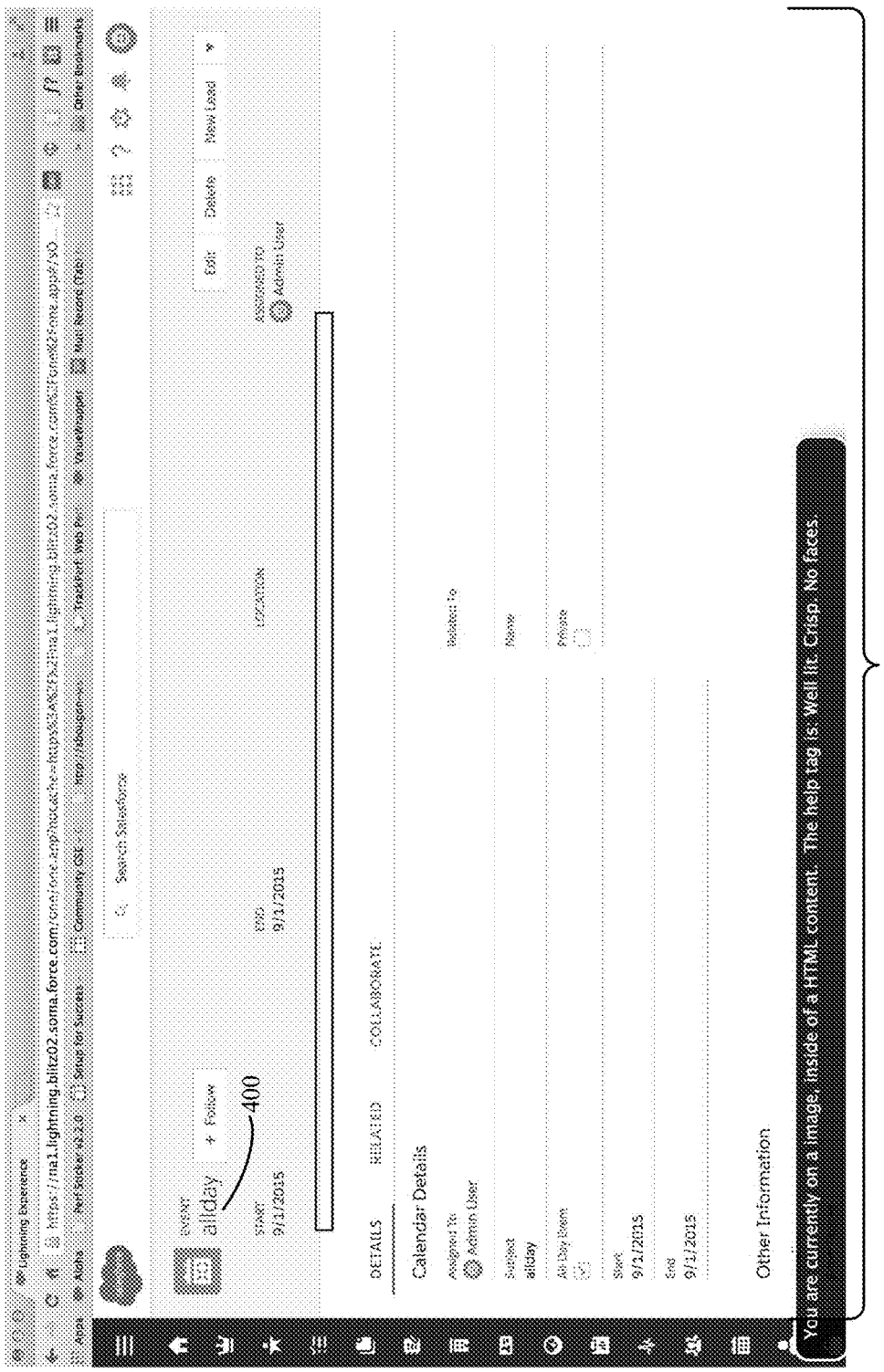
Figure 4C:
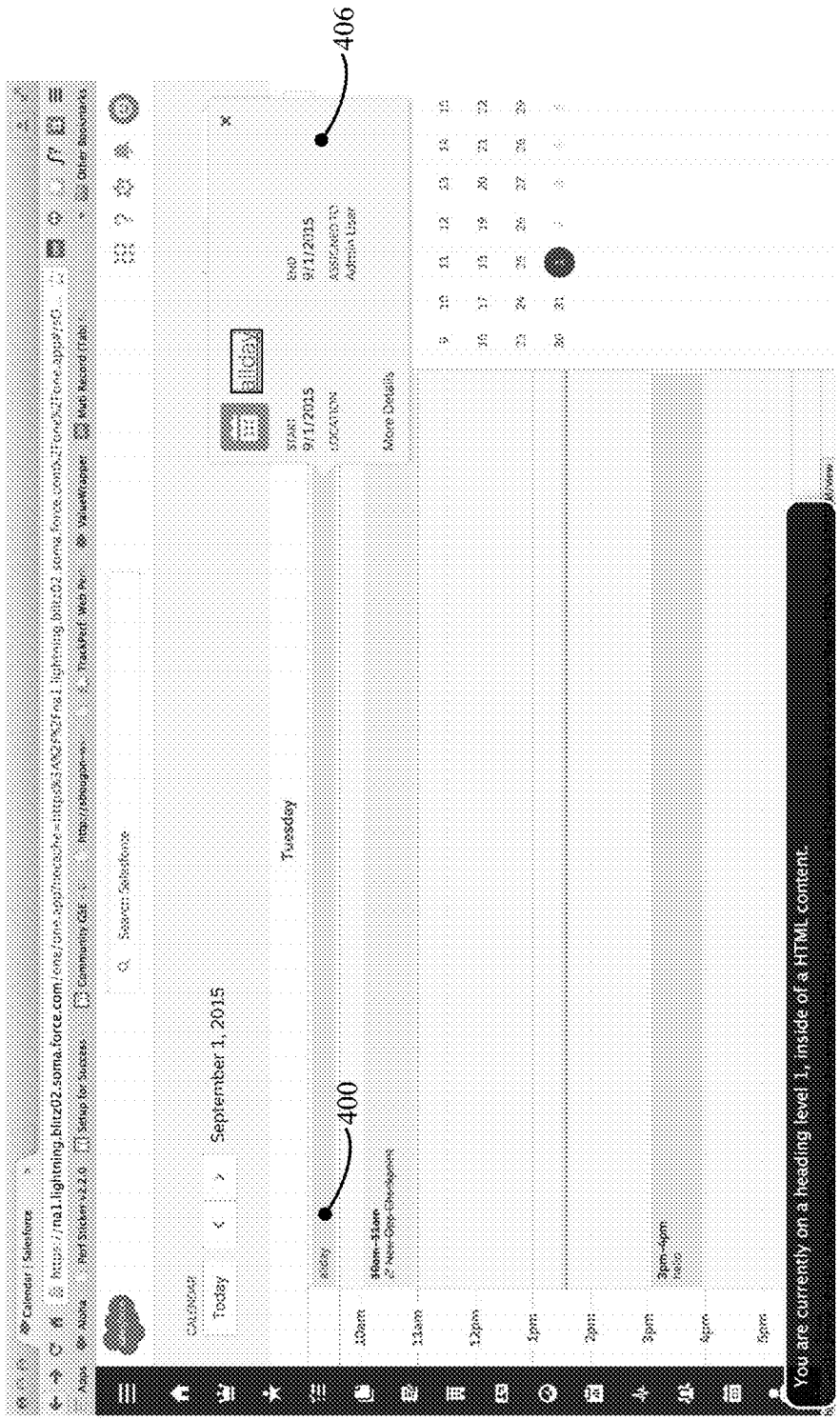

FIG. 1 shows a flowchart of an example of a method 100 for processing keyboard input to perform events in relation to calendar items using a web browser-based application or online service, performed in accordance with some implementations. FIG. 1 is described with reference to FIGS. 2-4C. FIG. 2 shows a block diagram of an example of a Calendar Database 200, in accordance with some implementations. FIG. 3 shows an example of visual representations of calendar items in the form of a graphical user interface (GUI) as displayed on a computing device, in accordance with some implementations. FIGS. 4A-C show examples of visual representations of calendar items in the form of graphical user interfaces (GUIs) as displayed on a computing device, in accordance with some implementations.

At 104 of FIG. 1, Calendar Database 200 of FIG. 2 is maintained. Calendar Database 200 can be maintained by servers on behalf of an organization such as Eyre Books, by a third party such as salesforce.com, inc., or both. For example, Calendar Database 200 can form part of a database system 16 of FIGS. 5A and 5B. In some cases, calendar data can be stored in tenant data storage 22, described in greater detail below. Calendar Database 200 can store a wide variety of customizable data objects. For example, in FIG. 2, some data objects in Calendar Database 200 might identify Calendar Items 204. As described above, Calendar Items 204 signify events on a calendar such as meetings, appointments, get-togethers, reminders, etc. Such Calendar Items 204 can be both pre-defined calendar items and user-defined calendar items. Specific types of Calendar Items 204 can vary across implementations. For example, such Calendar Items 204 may relate to a variety of types of records. By way of illustration, some Calendar Items 204 may relate to Customer Relationship Management (CRM) records such as accounts, tasks, leads, contacts, contracts, opportunities etc. By way of example, a calendar item for a meeting that Jane has scheduled with Rochester to follow up on a specific lead that Eyre Books is pursuing can be stored in Calendar Database 200.

In some implementations, each Calendar Item 204 can have a date, a subject, and a time range. By way of example, the calendar item Meeting B 208 has a subject of "Meeting B," a date of Sep. 4, 2015, and a time range of 8:30-9:30 A.M., as described in more detail below. Along the same lines, Early Morning Meetup 212 is an example of a calendar item that has a subject of "Early Morning Meetup," a date of Sep. 4, 2015, and a time range of 8:00-9:00 A.M.

At 108 of FIG. 1, bounding window 300 of FIG. 3 of a web browser is displayed in a user interface on a display of a computing device. Bounding window 300 includes pane 304, which includes visual representations of calendar items, e.g. visual representations 308 and 316, for the week of Aug. 30, 2015 thru Sep. 5, 2015. Such calendar items can be stored in Calendar Database 200 of FIG. 2. As shown in FIG. 3, visual representation 308 includes a presentation the subject and the time range for a calendar item with a subject "Executive Briefing (Luncheon Meeting)" and time-range of 12 P.M. to 1 P.M. Also or alternatively, a visual representation of a calendar item can include a partially obscured presentation of the subject, time-range and/or date of the calendar item. In some implementations, the time range, date, and subject of a calendar item can be partially or completely obscured in a visual representation of the calendar item. Also or alternatively, the time range, date, and/or subject of a calendar item can be completely unobscured in a visual representation of the calendar item.

In some implementations, visual representations of calendar items can be displayed in a manner that is accessible to colorblind or low-vision users. For example, as shown in FIG. 3, visual representations of calendar items can have a color contrast that meets a designated color contrast threshold, such as the Web Content Accessibility Guidelines color contrast threshold. In order to meet such a color contrast threshold, visual representations of calendar items can each have the same background color, as shown in FIG. 3. Additionally, any text included in a visual representation of a calendar item can be bolded or have a color that sharply contrasts with the background of the visual representation of the calendar item.

Also or alternatively, unlike conventional web-based calendars, attributes of calendar items, such as whether a calendar item has occurred in the past or whether the calendar item will occur in the future, can be indicated in a manner that is independent of the background color of the visual representation of the calendar item. By way of example, visual representation 316 of a past calendar item includes a presentation of a struck-through time and subject of the past calendar item. Also or alternatively, past calendar items can be visually represented in a variety of other manners such as with a bolded, underlined, and/or italicized time range and/or subject.

In some implementations, bounding window 300 of FIG. 3 can include all-day trough 312. All-day trough 312 can include visual representations of calendar items having a time range of twelve hours or greater. Alternatively, all-day trough 312 can include only visual representations of calendar items having a time range of twenty four hours.

At 112 of FIG. 1, keyboard input from a user interacting with a calendar item, is processed. Such keyboard input can be received over a data network such as the internet from a computing device such as a laptop or desktop computer. Such keyboard input can include the pressing or holding of any key or combination of keys on the keyboard of a computing device.

Keyboard inputs and interactions with calendar items can vary across implementations. By way of example, Rochester might wish to generate a new calendar item by navigating to New Event Button 320 using the tab key and pressing the enter key on the keyboard of his computing device. Also or alternatively, Rochester might generate a new calendar item by holding down the control key while pressing the "N" key on the keyboard of his computing device. Rochester might wish to navigate between buttons or calendar items, in which case he can use the tab key or arrow keys on the keyboard of his computing device. Rochester might wish to change from a "week-view" showing calendar items for the week of Aug. 30, 2015 thru Sep. 5, 2015, as shown in FIG. 3, to a "day-view" showing calendar items for the day of Sep. 1, 2015, as shown in FIG. 4A. To switch between such views, Rochester can enter a keystroke, such as F4 on the keyboard of his computing device. Rochester may also wish to view a detailed-record-view of a particular calendar item, such as the detailed record view shown of allday calendar item 400 in FIG. 4B. To do so, Rochester can navigate to allday calendar item 400 in the week-view shown in FIG. 4A using the tab or arrow keys on the keyboard of his computing device and the enter key to change to the detailed record view of allday calendar item 400 shown in FIG. 4B.

In some implementations, a user can interact with a calendar item using mouse input as well as keyboard input. By way of illustration, Brocklehurst, a visually-able employee of Eyre books, might wish to interact with allday calendar item 400 of FIG. 4C such that detailed pop-up 406 is presented. To do so, Brocklehurst can move his mouse such that his mouse cursor hovers over allday calendar item 400 of FIG. 4C, causing detailed pop-up 406 to be presented. Also or alternatively, pop-up 406 may be presented in response to keyboard input as described above.

At 116 of FIG. 1, events to be performed in relation to a calendar item are determined based on the keyboard input processed at 112. In some implementations, such events can be determined by a database system based on a set of designated keystrokes corresponding to events. By way of example, the right arrow and tab keystrokes may both be designated keystrokes corresponding to the event of navigating forward between buttons and/or calendar items, the shift-tab and left arrow keystrokes may both be designated keystrokes corresponding to the event of navigating backwards between buttons and/or calendar items, the enter and escape keystrokes may both be designated keystrokes corresponding to the event of changing views, etc.

At 120 of FIG. 1, the events determined at 116 of FIG. 1 are performed. By way of illustration, a database system can transmit data over the internet to Rochester's computing device. Rochester's computing device can be configured to process the data to cause the events determined at 116, such as navigating between calendar items, to be performed on Rochester's computing device.

In some, but not all implementations, at 124 of FIG. 1, data can be transmitted to a computing device, causing the device to play an auditory representation of a calendar item such as Meeting B 208 of FIG. 2. By way of illustration, when Rochester navigates to Meeting B 208, a database system can transmit data to Rochester's laptop computer. Rochester's laptop computer can include a standard screen reader that is configured to process the data to play the narration: "Meeting B is a meeting with Jane surrounding the imminent release of Eyre Books' new braille e-reader device." The narration played by Rochester's laptop computer can include details that may not be included in a visual representation of Meeting B 208 such as a description of the subject matter of Meeting B 208. By way of example, the text depicted in box 408 of FIG. 4A represents speech that may be played by a computing device as an auditory representation of allday calendar item 400. Alternatively, an auditory representation of a calendar item can indicate equal or fewer details than a detailed visual representation of the calendar item.

In some implementations, a HyperText Markup Language (HTML) framework of a web-based calendar can be leveraged to organize calendar items and present visual and auditory representations of such calendar items in a variety of manners. For example, two different sets of HTML headers can be used to define visual and auditory representations of calendar items. By way of illustration, the first set of headers can define visual representations of calendar items and can be visible to sighted users. The first set of headers can be made unavailable to screen readers using the Document Object Model (DOM) attribute aria-hidden="true." Since the first set of headers is unavailable to screen readers, the first set of headers would not be part of an auditory representation of a calendar item. The second set of headers can be defined by HTML <h2> elements embedded in each day column of a web-based calendar. The second set of headers can be hidden to sight-able users by adding the attribute class="assistiveText," which allows a screen reader to access the content of the second set of headers but prevents the content of each of the second set of headers from being displayed when rendered on a display device by a web-browser.

Some of the disclosed techniques can be used to allow users having a variety of disabilities to interact with calendar items. For example, in some implementations, method 100 can be modified such that events are performed in relation to calendar items based on input other than keyboard input. Such input can include mouse input, voice input, eyelid movement input, foot-pedal input, etc. For instance, a user who cannot use his or her hands may speak into a microphone of a computing device. By way of example, Bertha, who is almost entirely paralyzed, might speak "create new calendar item" into her computing device. Bertha's speech can be translated to text using standard speech recognition techniques. The text can be parsed by a server of a database system. The server of the database system can then process the parsed text to generate a new calendar item in response to Bertha's speech.

Unlike conventional web-based calendars, in some implementations, navigation between calendar items can be linear. By way of illustration, a user can use the tab keystroke to navigate from a first calendar item to a second calendar item that is immediately subsequent in time to the first calendar item. Along these lines, a user can use the shift-tab keystroke to navigate from a third calendar item to a fourth calendar item that immediately precedes the third calendar item. As such, a blind user does not need to memorize a grid-like pattern of a traditional web-based calendar, but rather can navigate back-and-forth between calendar items in a linear manner using the tab and shift-tab keystrokes.

In some implementations, the disclosed techniques can be integrated with a web browser-based application or online service in a manner that is accessible to handicapped users. By way of illustration, bounding window 300 of FIG. 3 can include navigation bar 324, which can be accessed using a variety of techniques such as keyboard input, as described above. Navigation bar 324 can be used to navigate to between a web-based calendar and other components of an application or online service, such as the Salesforce1® platform. By way of illustration, Rochester has just finished working with his web-based calendar and would like to generate logs of his recent sales. As such, Rochester can enter keyboard input into the keyboard of his computing device to access navigation bar 324. For example, Rochester might access navigation bar 324 by entering the F9 key on the keyboard of his computing device. Rochester can navigate to various buttons of navigation bar 324 by pressing the tab or arrow keys on the keyboard of his computing device. Once Rochester has navigated to a button of navigation bar 324 that corresponds to the sales-logging page of his online sales platform, he can press the enter key on the keyboard of his computing device. Also or alternatively, Rochester can navigate to the sales-logging page simply by speaking the phrase "log sales" into a microphone of his computing device. Such speech can be converted to text and parsed by a server of a database system. The server of the database system can cause Rochester's computing device to open a sales-logging page in response to Rochester's speech.

Some of the disclosed techniques can be used to provide a calendar that is not only highly accessible to sight-impaired users but is also useful to sight-able users. By way of example, a variety of views of calendar items can be displayed when the web-based calendar is rendered by a web browser on a computing device. Each view can present different information pertaining to calendar items over different time periods. By way of illustration, as described above, pane 304 of FIG. 3 includes a week-view of calendar items, presenting visual representations of calendar items with dates within the week of Aug. 30, 2015 thru Sep. 5, 2015. Alternatively, pane 402 of FIG. 4A includes a day-view of calendar items, presenting visual representations of calendar items with a date of Sep. 1, 2015. On the other hand, pane 404 of FIG. 4B depicts a detailed record view presenting a variety of details pertaining to allday calendar item 400. Other views may vary across implementations and such views can be provided in conjunction with or separately from other features disclosed herein. Each view may also correspond to different auditory representations of calendar items, as described above.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 5A:
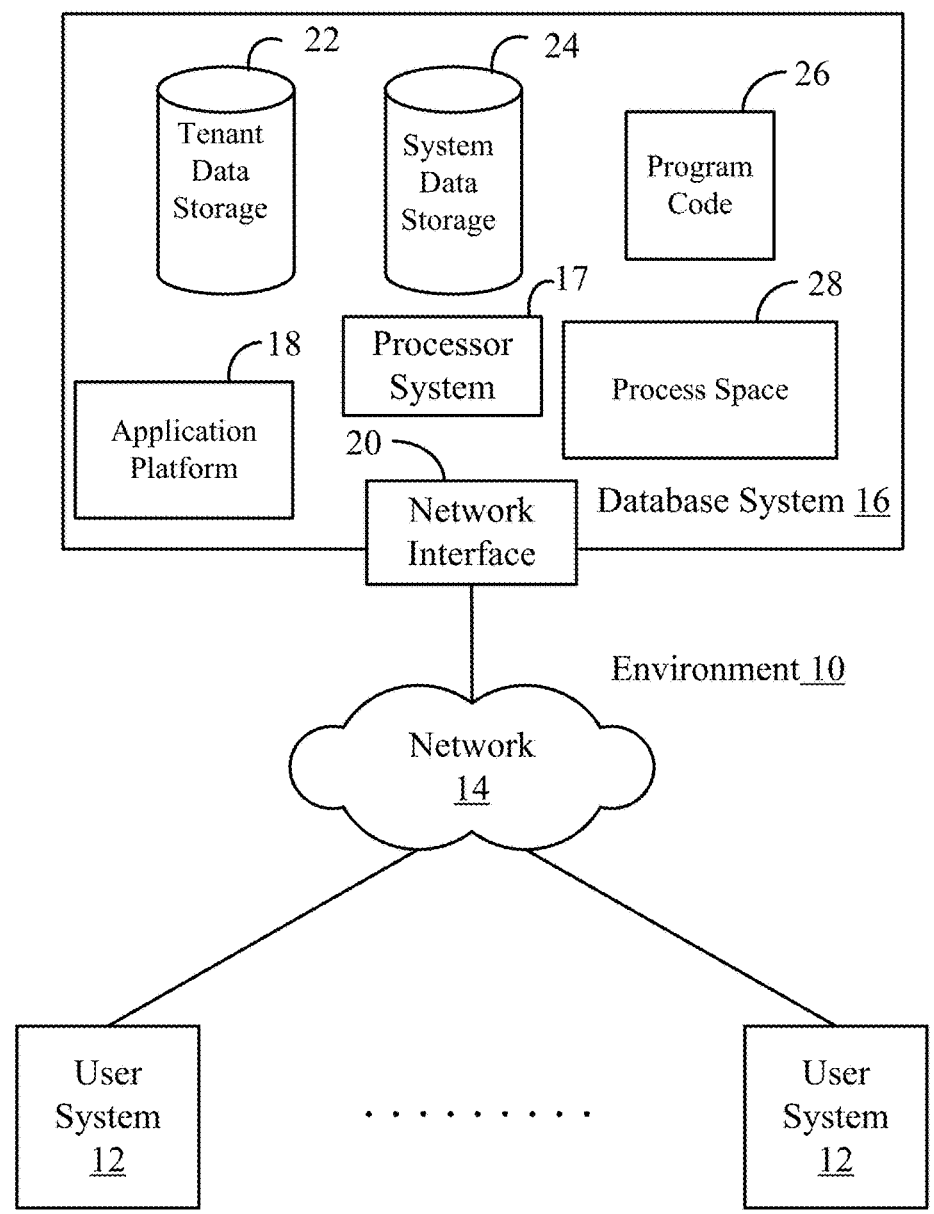
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
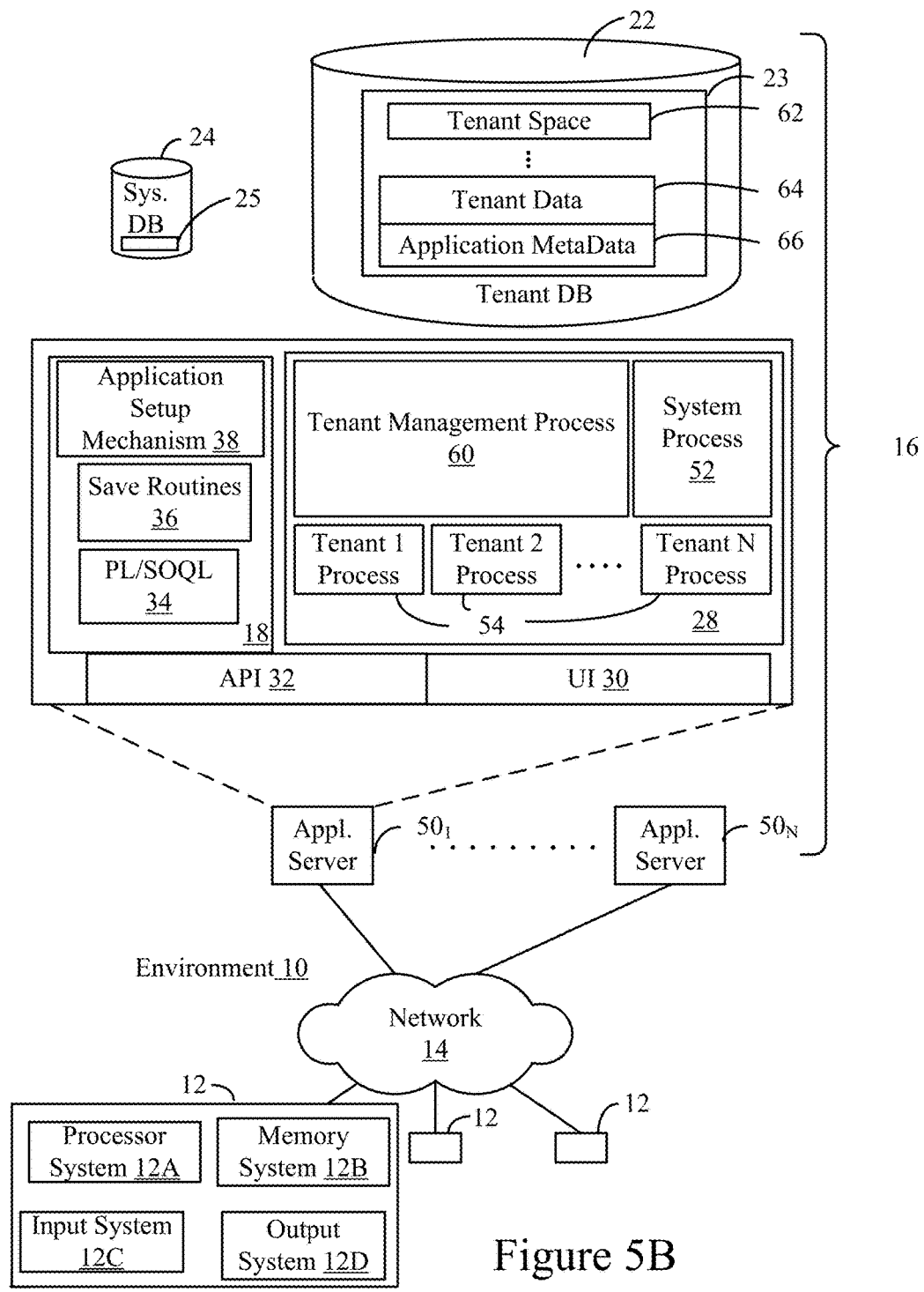
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
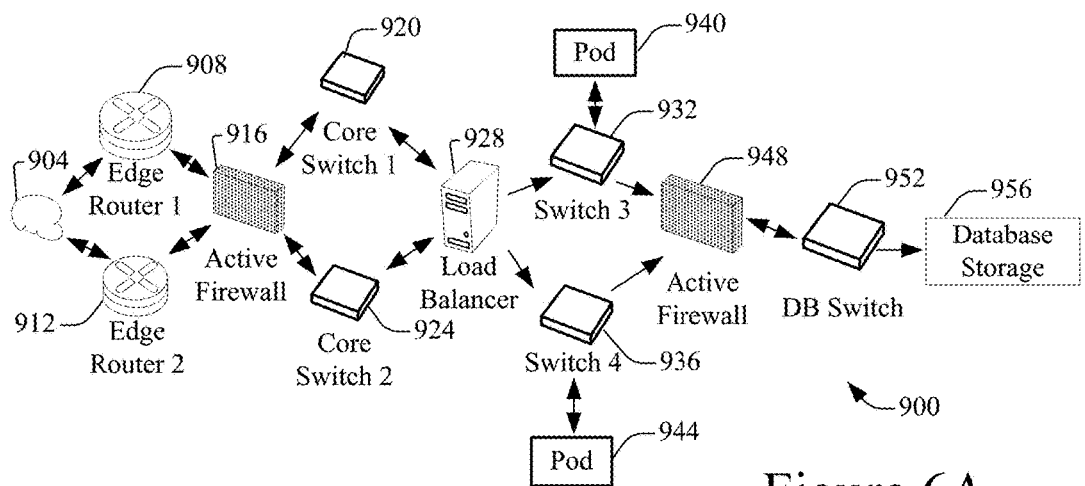
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
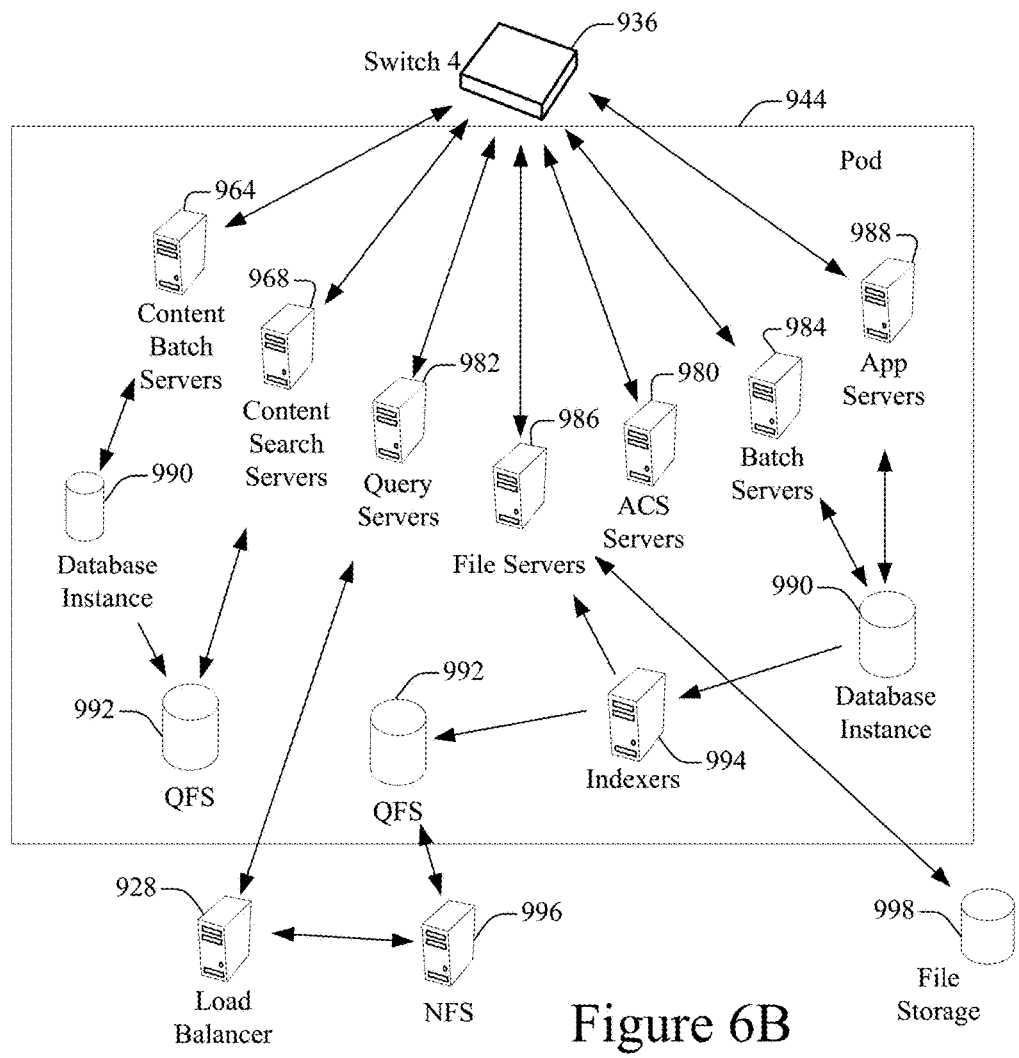
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-4C. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system implemented using a server system, the database system configurable to cause:
   maintaining a database storing data objects identifying a plurality of calendar items, each calendar item comprising a subject, a date, and a time range;
   displaying, in a user interface on a display of a device, a bounding window of a web browser comprising one or more panes, the one or more panes comprising visual representations of the calendar items, each visual representation comprising a presentation of one or more of the subject, the date, or the time range of a calendar item;
   processing keyboard input indicating a first one or more keystrokes on a keyboard of the device to interact with a first calendar item of the calendar items, the keyboard input received over a data network from the device;
   determining one of a plurality of different views of the first calendar item;
   identifying one of a plurality of auditory representations of the first calendar item as corresponding to the determined view;
   transmitting audio data to the device, the audio data configured to be processed by the device to play the identified auditory representation of the first calendar item;
   identifying, from a plurality of computing events capable of being performed in relation to the first calendar item, a first one or more computing events as being mapped to the first one or more keystrokes; and
   performing the identified one or more computing events.

2. The database system of claim 1, wherein the identified auditory representation indicates one or more details, the one or more details not being indicated by the visual representation of the first calendar item.

3. The database system of claim 1, wherein at least one of the identified one or more computing events comprises: generating, modifying or deleting the first calendar item.

4. The database system of claim 1, wherein the visual representation of a past calendar item comprises a presentation of one or both of a struck-through time or subject of the past calendar item.

5. The database system of claim 1, wherein the visual representations of the calendar items have a color contrast, the color contrast meeting a designated color contrast threshold.

6. The database system of claim 5, wherein each of the visual representations of the calendar items has a background, each background being a same color.

7. The database system of claim 1, wherein a pane includes an all-day trough, the all-day trough comprising visual representations of calendar items having a time range of twelve hours or greater.

8. The database system of claim 1, wherein at least one of the calendar items is associated with at least one of a plurality of types Customer Relationship Management (CRM) records of a CRM system, the types of CRM records comprising: accounts, tasks, leads, contacts, contracts and opportunities.

9. The database system of claim 1, wherein the visual representation of the first calendar item is defined at least in part by a first HyperText Markup Language (HTML) header, and the identified auditory representation of the first calendar item is defined at least in part by a second HTML header different from the first HTML header.

10. A method comprising:
    maintaining, by one or more servers of a database system, a database storing data objects identifying a plurality of calendar items, each calendar item comprising a subject, a date, and a time range;
    causing display of, in a user interface on a display of a device, a bounding window of a web browser comprising one or more panes, the one or more panes comprising visual representations of the calendar items, each visual representation comprising a presentation of one or more of the subject, the date, or the time range of a calendar item;
    receiving keyboard input indicating a first one or more keystrokes on a keyboard of the device to interact with a first calendar item of the calendar items, the keyboard input received over a data network from the device;
    determining one of a plurality of different views of the first calendar item;
    identifying one of a plurality of auditory representations of the first calendar item as corresponding to the determined view;
    transmitting audio data to the device, the audio data configured to be processed by the device to play the identified auditory representation of the first calendar item;
    identifying, from a plurality of computing events capable of being performed in relation to the first calendar item, a first one or more computing events as being mapped to the first one or more keystrokes; and
    causing the identified one or more computing events to be performed.

11. The method of claim 10, wherein the identified auditory representation indicates one or more details, the one or more details not being indicated by the visual representation of the first calendar item.

12. The method of claim 10, wherein at least one of the identified one or more computing events comprises: generating, modifying or deleting the first calendar item.

13. The method of claim 10, wherein the visual representation of a past calendar item comprises a presentation of one or both of a struck-through time or subject of the past calendar item.

14. The method of claim 10, wherein the visual representations of the calendar items have a color contrast, the color contrast meeting a designated color contrast threshold.

15. The method of claim 10, wherein the visual representation of the first calendar item is defined at least in part by a first HyperText Markup Language (HTML) header, and the identified auditory representation of the first calendar item is defined at least in part by a second HTML header different from the first HTML header.

16. A computer program product comprising computer-readable program code capable of being executed by one or more processors when retrieved from a non-transitory computer-readable medium, the program code comprising instructions configurable to cause:
    maintaining, by one or more servers of a database system, a database storing data objects identifying a plurality of calendar items, each calendar item comprising a subject, a date, and a time range;
    displaying, in a user interface on a display of a device, a bounding window of a web browser comprising one or more panes, the one or more panes comprising visual representations of the calendar items, each visual representation comprising a presentation of one or more of the subject, the date, or the time range of a calendar item;

processing keyboard input indicating a first one or more keystrokes on a keyboard of the device to interact with a first calendar item of the calendar items, the keyboard input received over a data network from the device;

determining one of a plurality of different views of the first calendar item;

identifying one of a plurality of auditory representations of the first calendar item as corresponding to the determined view;

transmitting audio data to the device, the audio data configured to be processed by the device to play the identified auditory representation of the first calendar item;

identifying, from a plurality of computing events capable of being performed in relation to the first calendar item, a first one or more computing events as being mapped to the first one or more keystrokes; and performing the identified one or more computing events.

17. The computer program product of claim 16, wherein the identified auditory representation indicates one or more details, the one or more details not being indicated by the visual representation of the first calendar item.

18. The computer program product of claim 16, wherein at least one of the identified one or more computing events comprises: generating, modifying or deleting the first calendar item.

19. The computer program product of claim 16, wherein the visual representation of a past calendar item comprises a presentation of one or both of a struck-through time or subject of the past calendar item.

20. The computer program product of claim 16, wherein the visual representation of the first calendar item is defined at least in part by a first HyperText Markup Language (HTML) header, and the identified auditory representation of the first calendar item is defined at least in part by a second HTML header different from the first HTML header.

* * * * *